United States Patent
Graham et al.

[11] Patent Number: 5,829,477
[45] Date of Patent: Nov. 3, 1998

[54] MODULAR REGULATOR

[75] Inventors: Thomas Graham, Ocean; Yushan Wang, Howell, both of N.J.

[73] Assignee: Taprite-Fassco Manufacturing, Inc., San Antonio, Tex.

[21] Appl. No.: 707,726

[22] Filed: Sep. 4, 1996

[51] Int. Cl.[6] .................................................. F16K 25/00
[52] U.S. Cl. ................ 137/454.2; 137/505; 137/505.36; 137/454.6
[58] Field of Search ............................ 137/454.2, 454.5, 137/454.6, 505

[56] References Cited

U.S. PATENT DOCUMENTS

| | | | |
|---|---|---|---|
| 3,000,393 | 9/1961 | Maynard | 137/454.2 |
| 3,103,231 | 9/1963 | Moen | 137/454.2 |
| 4,532,956 | 8/1985 | Cardenas-Franco | 137/454.2 |
| 4,836,240 | 6/1989 | Elliot | 137/454.5 |
| 4,942,899 | 7/1990 | Vork | 137/454.5 |
| 4,979,530 | 12/1990 | Breda | 137/454.2 |
| 5,064,166 | 11/1991 | Schechter | 137/454.2 |
| 5,076,320 | 12/1991 | Robinson | 137/454.2 |
| 5,113,898 | 5/1992 | White | 137/454.5 |
| 5,615,860 | 4/1997 | Brehm | 137/454.2 |
| 5,651,387 | 7/1997 | Thor | 137/454.2 |

*Primary Examiner*—Henry A. Bennett
*Assistant Examiner*—Ramyar Farid
*Attorney, Agent, or Firm*—Selitto & Associates

[57] ABSTRACT

A gas regulator is of a modular construction, having a base providing coupling to a gas supply system and a body in which the pressure regulation elements are located. The base and body form a plug and socket type connection, the body being removable from the base, for repair or replacement without the base being disconnected from the gas supply. Inlet and outlet ports in the base align with corresponding inlet and outlet chambers in the body to provide a gas flow path through the regulator with the base and body connected.

15 Claims, 2 Drawing Sheets

MODULAR REGULATOR

The present invention relates to a new and improved regulator for use in controlling or modulating the pressure of supplied gases.

BACKGROUND OF THE INVENTION

Gas regulators are a staple of industry, being used in a wide variety of applications to control and maintain the pressure of gases utilized in industrial, commercial and home uses. Such regulators are typically precision devices, able to maintain relatively constant output pressures over a wide range of input pressures and environmental conditions.

Because of their sensitivity, regulator repair and adjustment are typically the province of trained servicemen. When a regulator is in need of repair or replacement, it can represent a sizeable cost in both time and labor. Repair or replacement typically requires disconnecting the regulator, and its often associated equipment, such as flow meters, valves and the like, from the gas supply, repair or replacement of the operating mechanism, and reinstallation of the regulator and the associated equipment into the system. In addition, experience has shown that, because of the delicate nature of the regulator and the interplay between its components, inattention or carelessness during a repair, as well as the removal and installation processes themselves, may result in further or other damage or misadjustment to the regulator.

It is accordingly a purpose of the present invention to provide a new and improved regulator structure which allows the operative elements of the regulator to be removed from an operating system with minimal disassembly of the associated system components.

Another purpose of the present invention is to provide a gas regulator in which the operating elements are in a sub-housing, while system coupling components are in another housing.

Still a further purpose of the present invention is to provide a regulator of a modular construction in which a housing portion, in which the operating elements are located, may be easily separated and removed from another housing portion without necessity of complete disconnection from the operating system.

Yet another purpose of the present invention is to provide a two-part regulator in which the parts are joined by a plug and socket-type connection.

Still another purpose of the present invention is to provide a modular regulator which provides for improved means for coupling housing portions of the regulator together, irrespective of relative orientation.

BRIEF DESCRIPTION OF THE INVENTION

In accordance with the above and further purposes and objects, the present invention comprises a gas regulator, which may be of the spring and diaphragm type, having a regulator base in which inlets and outlets are located and which provide coupling means between the regulator and a gas system. The base has an aperture into which a regulator body is mounted. The regulator body houses the gas-controlling elements. Inlets and outlets in the base terminate at the aperture, and align with corresponding passageways in the regulator body which direct the gas flow to and from the gas controlling element. The base and body mate together in a plug and socket configuration, allowing the body to be removed from and replaced in the base without disconnecting the base from the gas system. A gasket system is employed to provide for gas-tight seals between the base and body.

In a preferred embodiment the regulator aperture base may be formed with a cylindrical inner surface, with inlets and outlets leading thereto. Similarly, the regulator body may be formed with a mating cylindrical portion having peripheral gas entrance and exit chambers which allows the regulator body to be inserted in the base without regard for radial alignment with the inlets and outlets.

BRIEF DESCRIPTION OF THE DRAWINGS

A fuller understanding of the present invention will be accomplished upon review of the following detailed description of a preferred, but nonetheless illustrative embodiment of the invention, when reviewed in conjunction with the annexed drawings, wherein.

DETAILED DESCRIPTION OF THE INVENTION

Figure 1:
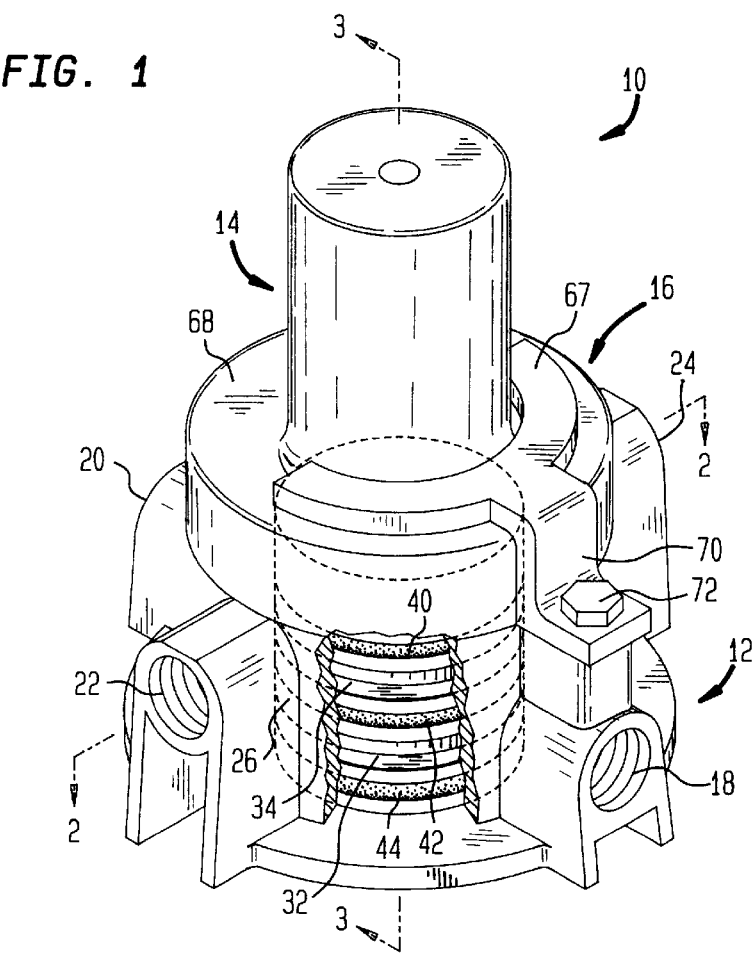
FIG. 1 is a perspective view, partially cut away, of a modular regulator constructed in accordance with the present invention.

With initial consideration of FIG. 1, a modular regulator 10, which may be used, for example, in conjunction with the supply of carbon dioxide gas for carbonated beverage dispensing, comprises regulator base 12 in which is mounted regulator body 14. As will be explained in further detail, regulator body 14 encloses and supports the gas pressure control mechanism of the regulator 10, while regulator base 12 provides an interface between the pressure control mechanism and the gas system with which the regulator 10 is employed. A clamp assembly 16 may be provided to retain the regulator body 14 in the base 12 and to prevent unauthorized regulator body 14 removal or tampering.

As seen in the Figures, regulator base 12 includes an aperture or cavity, preferably cylindrical, extending substantially through the base 12, surrounding and forming a socket for the regulator body 14. The base wall surrounding the aperture is provided with a first set of diametrically opposed inlets 18, 20, and a second pair of diametrically opposed outlets 22, 24. The inlets 18, 20 and outlets 22, 24 which may comprise threaded bores configured to accept couplings and connectors as known in the art, are preferably oriented perpendicularly to each other. Pairs of inlets 18, 20 and outlets 22, 24 are provided to facilitate the connection of gauges or meters on both the inlet and outlet sides of the regulator base 12 along with the gas flow connections. The individual inlets 18, 20 and outlets 22, 24 may be utilized or capped as required. As perhaps best seen in FIGS. 1 and 2, the inlets 18, 20 and outlets 22, 24 are oriented in two separate horizontal planes or levels, extending through the base 12 and exiting at different levels at the socket aperture, allowing them to independently interface with inlet and outlet portions of the regulator control mechanism as explained herein.

Figure 3:
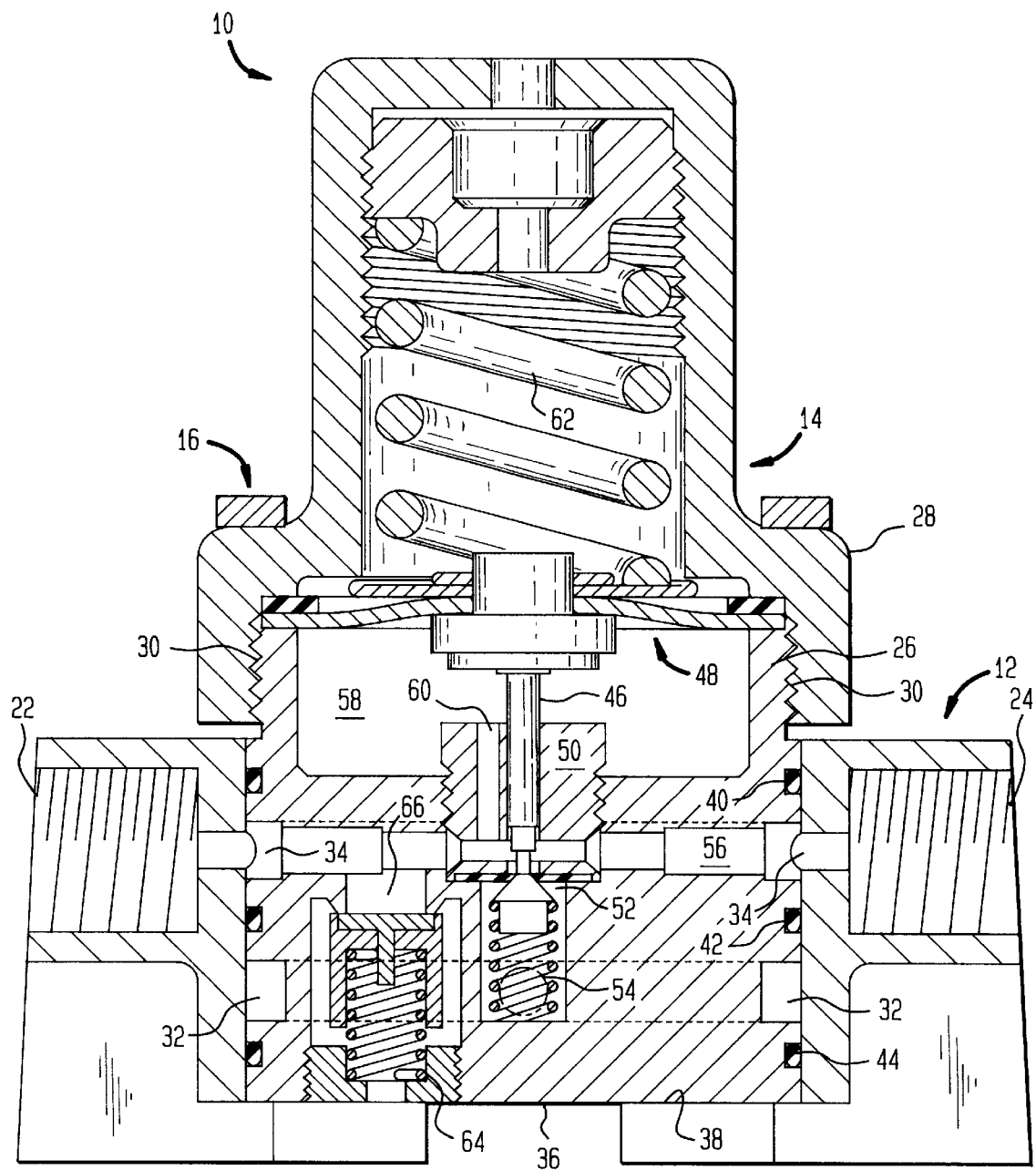
FIG. 3 is a side elevation view in section taken along line 3—3 of FIG. 1.

With particular reference to FIG. 3, regulator body 14, which forms a plug-like connector with the base socket, may preferably comprise a lower body portion 26 and a bonnet 28. Mating threads 30 allow the bonnet 28 to be removably mounted upon the lower body 26. The lower body 26, which may be formed of aluminum or similar metal, is particularly sized and dimensioned to fit as a plug within the mating socket cavity of the regulator base 12. As seen in the Figures the lower body 26 may be cylindrical to mate with a compatible cylindrical socket aperture. First and second peripheral grooves or channels 32, 34, which preferably encircle the lower body 26, form an inlet and an outlet chamber, respectively, in the regulator body 14, and are positioned to align with the inlets 18, 20 and outlets 22, 24 in regulator base 12 when the regulator body 14 is fully seated therein, as may be determined by contact between a bottom surface 36 of lower body 26 and an inner ledge 38 formed in regulator base 12 serving as a stop. Three O-rings or gaskets 40, 42, 44 are mounted in respective peripheral receiving slots about the periphery of the lower body 26 to provide gas-tight seals between the lower body 26 and base 12, and to seal the inlet and outlet chamber grooves 32, 34. The gaskets 40, 42, 44 may alternatively be mounted upon the inner surface of the socket aperture in the base 12. With a circular cross-section for the lower body 26, and the inlet and outlet chambers extending entirely about its periphery as depicted in the Figures, the regulator body 14 may be inserted into the regulator base 12 without regard for angular orientation, as the inlets 18, 20 and outlets 22, 24 in the base 12 will always align with the associated chamber in the regulator body 14. Alternatively, alignment means may be provided to allow the body 14 to be inserted into the base 12 to align the inlets 18, 20 and outlets 22, 24 with the inlet and outlet chambers in the body 14.

Figure 2:
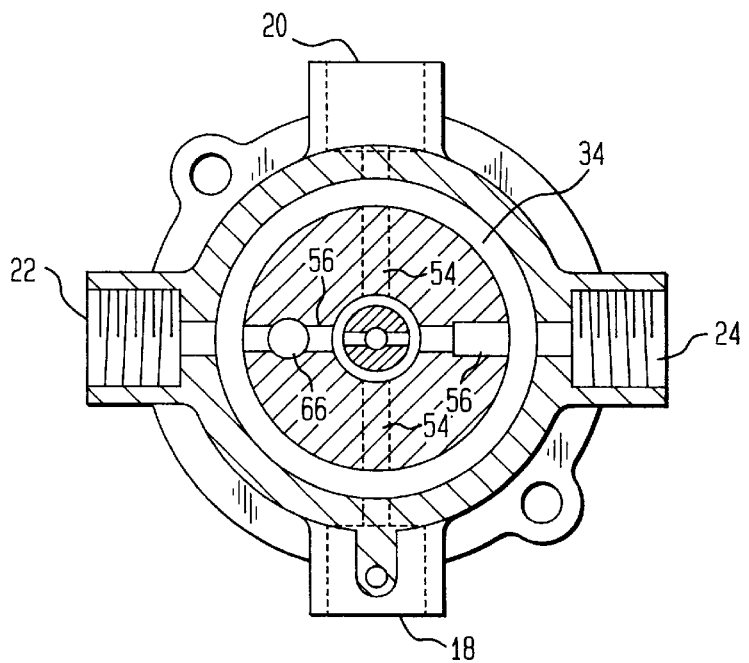
FIG. 2 is a top plan view in section taken along line 2—2 of FIG. 1.

The pressure control elements of the regulator, located within the regulator body 14 and covered by bonnet 28, may be as known in the art and may include a stem 46 coupled to diaphragm assembly 48. Stem 46, in conjunction with threaded capsule 50, defines a modulating valve assembly which passes gas from spring chamber 52, which is coupled to the peripheral inlet chamber groove 32 by inlet passageways 54, to outlet passageways 56 which are in turn connected to the peripheral outlet chamber groove 34, as seen in FIGS. 2 and 3. The pressure developed by the modulated gas within diaphragm chamber 58, to which the outlet passageways 56 are joined through vertical bore 60, offsets the counteracting force against the diaphragm 48 produced by the spring system of the regulator 10, including mainspring 62, causing the stem assembly 46 to be modulated upwardly and downwardly, continuously valving the gas through the regulator 10 and thus controlling gas output pressure. An overpressure relief valve 64 in bore 66 may be provided in the exit path for overpressure relief as known in the art.

As may be appreciated, regulator body 14 may be easily installed in and removed from, regulator base 12 by a simple plug-like action, the regulator base 12 and body 14 forming a plug and socket-type assembly. With the regulator body 14 removed, which may be accomplished without physical uncoupling of the regulator base 12 from the gas system to which the regulator 10 is connected, the regulator body 14 itself may be readily replaced, or disassembled for repair by unthreading the bonnet 28 from the lower body 26. Because the gas enters and leaves the regulator body 14 through horizontally-directed passageways 32, 34, there are no vertical forces developed between the body 14 and base 12, thus insuring that operation of the regulator 10 will not lead to misregistration or separation of the body 14 and base 12.

While the Figures present an embodiment in which the peripheral grooves or channels 32, 34 function as gas reception chambers which couple to inlets 18, 20 and outlets 22, 24 in the base 12 irrespective of relative radial orientation of the regulator body 14, the base 12 may similarly or alternatively be provided with similar grooves or channels upon the inner surface of the socket aperture to form peripheral gas reception chambers in the base 12. These grooves are in alignment with the grooves 32, 34. Alternatively, grooves 32, 34 may be eliminated, the inlet passageways 54 and outlet passageways 56 directly terminating at the periphery of the lower body 26 in register with the base grooves, providing gas flow to and from the body 14 irrespective of radial body alignment.

To provide against unauthorized removal or tampering, a clamp assembly 16 may be provided. As best seen in FIG. 1, clamp assembly 16 may include a forked arm 67 which lies above an exterior shoulder 68 of the bonnet 28 and which embraces the upper portion of the bonnet 28. An angled leg 70 of the clamp assembly 16 is provided with a throughbore which aligns with a vertical bore formed in a portion of the regulator base 12. A bolt 72 secures the clamp assembly 16 in place thus preventing the regulator body 14 from being separated from the base 12 without removal of the clamp assembly 16. The head of the bolt 72 may be provided with a particularly formed head to allow gripping and thus bolt rotation and removal only by a particularly configured tool, further preventing unauthorized disassembly. Alternatively, other clamp means may be employed.

We claim:

1. A fluid pressure regulator, comprising:

a base having an outer end, an inner end, and an aperture defining an inner circumferential surface in said base, said aperture having an open end proximal to said outer end of said base and an opposite end distal from said outer end of said base;

supplying means, including at least one threaded inlet, for supplying fluid to said regulator, said supplying means being provided in said base between said outer end thereof and said inner end thereof and communicating with said aperture between said open end thereof and said opposite end thereof;

discharging means, including at least one threaded outlet, for discharging fluid from said regulator, said discharging means being provided in said base between said outer end thereof and said inner end thereof and communicating with said aperture between said open end thereof and said opposite end thereof;

a body removably positioned in said aperture of said base, said body having an external portion extending outwardly from said outer end of said base and an internal portion extending into said aperture of said base and terminating in a free end located substantially adjacent said inner end of said base, said internal portion having an outer circumferential surface which engages said inner circumferential surface of said base, said internal portion of said body being slidably removable from said open end of said aperture along a longitudinal axis thereof and being provided with at least one inlet passageway in said outer circumferential surface thereof and at least one outlet passageway in said outer circumferential surface thereof, said internal and external portions housing a pressure control system of a spring and diaphragm type which includes a channel connecting said at least one inlet passageway and said at least one outlet passageway, a valve stem extending through a control port between said at least one inlet passageway and said at least one outlet passageway and having a valve member at one end and a diaphragm connected at an opposite end, said diaphragm defining a biasing chamber and a control chamber, which is in fluid communication with said at least one outlet passageway, and a spring located in said biasing chamber for urging said valve member open, whereby said valve member is modulated between its open and closed positions as fluid flows through said at least one outlet passageway to thereby cause the fluid outlet pressure, which is a function of the amount of biasing applied by said spring, to be maintained at that pressure, which is lower than the fluid inlet pressure;

first conveying means in fluid communication with said supplying means of said base and said at least one inlet passageway of said body, said first conveying means extending completely and circumferentially around said aperture, thereby minimizing the creation of axial forces which would tend to cause inadvertent movement of said body along said longitudinal axis of said aperture, said first conveying means including a first continuous circular groove formed in said outer circumferential surface of said internal portion of said body;

second conveying means in fluid communication with said at least one outlet passageway of said body and said discharging means of said base, said second conveying means extending completely and circumferentially around said aperture, thereby minimizing the creation of axial forces which would tend to cause inadvertent movement of said body along said longitudinal axis of said aperture, said second conveying means including a second continuous circular groove formed in said outer circumferential surface of said internal portion of said body; and first sealing means for creating a fluid-tight seal between said free end of said internal portion of said body and said supplying and discharging means such that fluid flowing to and from said regulator through said supplying and discharging means is inhibited from flowing between said inner end of said base and said free end of said internal portion of said body to thereby inhibit inadvertent movement of said body along said longitudinal axis of said aperture, whereby the risk of unintentional ejection of said body from said base due to fluid pressure is reduced.

2. A fluid pressure regulator according to claim 1, wherein said aperture of said base is cylindrical, wherein said inner circumferential surface of said base is cylindrical and wherein said outer circumferential surface of said internal portion of said body is cylindrical.

3. A fluid pressure regulator according to claim 1, wherein said first sealing means includes a first O-ring positioned between said outer circumferential surface of said internal portion of said body and said inner circumferential surface of said base.

4. A fluid pressure regulator according to claim 1, wherein said supplying means includes a first threaded inlet on one side of said base and a second threaded inlet on an opposed side of said base.

5. A fluid pressure regulator according to claim 1, wherein said discharging means includes a first threaded outlet on one side of said base and a second threaded outlet on an opposed side of said base.

6. A fluid pressure regulator according to claim 1, wherein said discharging means communicates with said aperture between said open end thereof and said supplying means.

7. A fluid pressure regulator according to claim 1, wherein said body further includes a bonnet threadedly mounted on said external portion of said body.

8. A fluid pressure regulator according to claim 7, further comprising clamping means for mechanically clamping said body to said base.

9. A fluid pressure regulator according to claim 8, wherein said clamping means includes an arm engaging an exterior shoulder of said bonnet, an angled leg depending from said arm, and connecting means for connecting said angled leg to said base.

10. A fluid pressure regulator according to claim 9, wherein said connecting means includes a bolt passing through said angled leg and threadedly received in said base.

11. A fluid pressure regulator according to claim 3, further comprising second sealing means for creating a fluid-tight seal between said supplying means and said discharging means and third sealing means for creating a fluid-tight seal between said open end of said aperture and said supplying and discharging means.

12. A fluid pressure regulator according to claim 11, wherein said second sealing means includes a second O-ring positioned between said outer circumferential surface of said internal portion of said body and said inner circumferential surface of said base and wherein said third sealing means includes a third O-ring positioned between said outer circumferential surface of said internal portion of said body and said inner circumferential surface of said base.

13. A fluid pressure regulator according to claim 1, further comprising aligning means for aligning said supplying means of said base with said at least one inlet passageway of said internal portion of said body and for aligning said discharging means of said base with said at least one outlet passageway of said internal portion of said body.

14. A fluid pressure regulator according to claim 13, wherein said aligning means includes said inner end of said base and said free end of said internal portion of said body, said inner end of said base functioning as a stop for said free end of said internal portion of said body as said body is inserted into said aperture of said base.

15. A fluid pressure regulator according to claim 1, wherein said body and said base form a plug and socket type connection.

* * * * *